(12) United States Patent
Peng et al.

(10) Patent No.: US 12,526,822 B2
(45) Date of Patent: *Jan. 13, 2026

(54) RESOURCE MULTIPLEXING INDICATION METHOD AND APPARATUS AND RELAY NODE

(71) Applicant: VIVO MOBILE COMMUNICATION CO., LTD., Guangdong (CN)

(72) Inventors: Shuyan Peng, Guangdong (CN); Huan Wang, Guangdong (CN); Jinhua Liu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 410 days.

This patent is subject to a terminal disclaimer.

(21) Appl. No.: 18/164,693

(22) Filed: Feb. 6, 2023

(65) Prior Publication Data

US 2023/0188252 A1    Jun. 15, 2023

Related U.S. Application Data

(63) Continuation of application No. PCT/CN2021/110932, filed on Aug. 5, 2021.

(30) Foreign Application Priority Data

Aug. 6, 2020  (CN) .......................... 202010785266.7

(51) Int. Cl.
*H04B 7/155*  (2006.01)
*H04L 1/00*  (2006.01)
(Continued)

(52) U.S. Cl.
CPC ........ *H04W 72/27* (2023.01); *H04B 7/15557* (2013.01); *H04L 1/0025* (2013.01);
(Continued)

(58) Field of Classification Search
CPC ........ H04B 7/14–17; H04L 1/00–0039; H04L 5/00–26; H04W 8/22–245;
(Continued)

(56) References Cited

U.S. PATENT DOCUMENTS

| | | |
|---|---|---|
| 2019/0014533 A1 | 1/2019 | Abedini et al. |
| 2020/0067687 A1 | 2/2020 | Qin et al. |

(Continued)

FOREIGN PATENT DOCUMENTS

| | | |
|---|---|---|
| CN | 108811097 A | 11/2018 |
| CN | 111066363 A | 4/2020 |

(Continued)

OTHER PUBLICATIONS

3rd Generation Partnership Project, Technical Specification Group Radio Access Network, NR, "Study on Integrated Access and Backhaul", (Release 16), 3GPP TR 38.874, V16.0.0, Dec. 2018, Valbonne, France.

(Continued)

*Primary Examiner* — Timothy J Weidner
(74) *Attorney, Agent, or Firm* — Price Heneveld LLP

(57) ABSTRACT

The application discloses a resource multiplexing indication method and apparatus and a relay node, which belong to the communication field. The method includes: determining a multiplexing mode of a relay node based on target information, where the target information includes at least one of the following: multiplexing mode indication information; timing mode information; and resource type information.

18 Claims, 3 Drawing Sheets

---

Determine a multiplexing mode of the relay node based on target information, where the target information includes at least one of the following: multiplexing mode indication information; timing mode information; and resource type information  ∽301

(51) Int. Cl.
*H04L 5/00* (2006.01)
*H04W 72/27* (2023.01)
*H04W 84/02* (2009.01)
*H04W 88/08* (2009.01)
*H04W 92/20* (2009.01)

(52) U.S. Cl.
CPC ........... *H04L 5/0091* (2013.01); *H04W 84/02* (2013.01); *H04W 88/08* (2013.01); *H04W 92/20* (2013.01)

(58) Field of Classification Search
CPC ..... H04W 40/24–32; H04W 48/02–20; H04W 56/001–0025; H04W 72/02–569; H04W 74/002–006; H04W 84/005–22; H04W 88/005–188; H04W 92/02–24
See application file for complete search history.

(56) References Cited

U.S. PATENT DOCUMENTS

| | | | |
|---|---|---|---|
| 2020/0145965 A1 | 5/2020 | Luo et al. | |
| 2020/0145997 A1 | 5/2020 | Luo et al. | |
| 2020/0229181 A1 | 7/2020 | Qi et al. | |
| 2021/0160861 A1 | 5/2021 | You et al. | |
| 2021/0195541 A1* | 6/2021 | Wei | H04W 72/21 |
| 2021/0345345 A1* | 11/2021 | Liu | H04W 72/20 |
| 2021/0367660 A1 | 11/2021 | Jo et al. | |
| 2023/0284209 A1* | 9/2023 | Peng | H04W 72/232 |

FOREIGN PATENT DOCUMENTS

| | | | |
|---|---|---|---|
| CN | 111436145 A * | 7/2020 | ............ H04W 72/20 |
| EP | 3611984 A1 | 2/2020 | |
| JP | 2022516804 A | 3/2022 | |
| WO | 2019194661 A1 | 10/2019 | |
| WO | 2020032578 A1 | 2/2020 | |
| WO | 2020143828 A1 | 7/2020 | |

OTHER PUBLICATIONS

QUALCOMM Incorporated, "Resource Management in IAB Network", 3GPP TSG RAN WG1 Meeting #95, R1-1813419, Nov. 12-16, 2018, Spokane, Washington, USA.

Qualcomm Incorporated (Rapporteur), TR 38.874, Version 0.6.0, 11.1.1—Study on Integrated Access and Backhaul for NR, 3GPP TSG-RAN WG2 Meeting #104, R2-1816872, Nov. 12-16, 2018, Spokane, WA, USA.

* cited by examiner

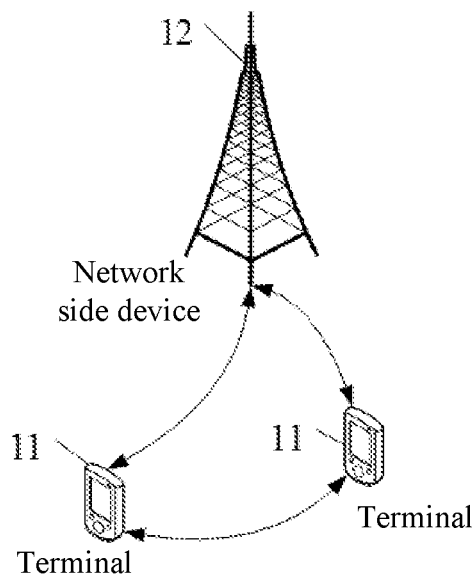
FIG. 1
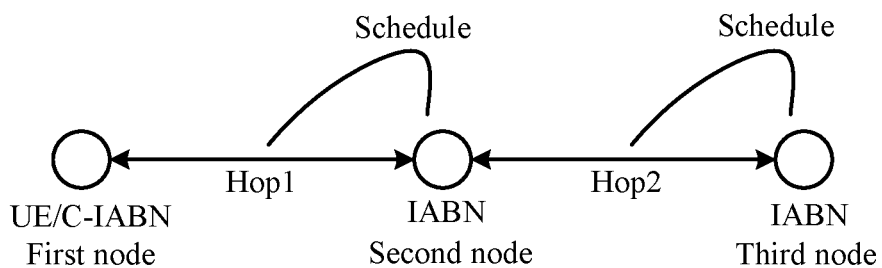
FIG. 2
Determine a multiplexing mode of the relay node based on target information, where the target information includes at least one of the following: multiplexing mode indication information; timing mode information; and resource type information ~301
FIG. 3

RESOURCE MULTIPLEXING INDICATION METHOD AND APPARATUS AND RELAY NODE

CROSS-REFERENCE TO RELATED APPLICATIONS

The present disclosure is a continuation application of International Application No. PCT/CN2021/110932 filed on Aug. 5, 2021, which claims priority to Chinese Patent Application No. 202010785266.7, filed with the Chinese Patent Office on Aug. 6, 2020, and entitled "RESOURCE MULTIPLEXING INDICATION METHOD AND APPARATUS AND RELAY NODE". The entire contents of each of the above-referenced applications are expressly incorporated herein by reference.

TECHNICAL FIELD

This application relates to the field of communications, and in particular, to a resource multiplexing indication method and apparatus and a relay node.

BACKGROUND

Currently, in the new radio (NR) system, integrated access backhaul (IAB) can provide extended coverage for NR cells, and can also enhance capacity for NR cells. An access node that supports user equipment (UE, which can also be referred to as a terminal device) wireless access and wireless data backhaul is called an IAB node (IABN). An access node that provides a wireless backhaul function for the IAB node to connect the UE to a core network (CN) is called a donor IAB node, and wired transmission is performed between the donor IAB and the core network. Data of the UE is transmitted between the UE and the access node through a wireless access link, and the data of the UE can be transmitted between access nodes through a wireless backhaul link.

In the IAB network architecture that supports the separated deployment of central units (CU)/distributed units (DU), an IAB node (IABN) includes a DU functional module and a mobile terminal (MT) functional module. Relying on the MT function module, an access node (that is, IABN) can find an upstream access node (that is, Parent IABN, P-IABN), and establish a wireless backhaul link with a DU of the upstream access node. After an IAB node establishes a complete backhaul link, the IAB node enables a DU function of the backhaul link, and the DU may provide a cell service, that is, the DU may provide an access service for UE. An integrated access and backhaul loop includes a donor IAB node, and DU function modules of all IAB nodes in the integrated access and backhaul loop may be connected to a CU node, that is, a CU function module of the donor IAB node.

In addition, in the IAB network architecture, the resource multiplexing method between the MT functional module and the DU functional module may include frequency duplex multiplexing (FDM), spatial duplex multiplexing (SDM) or co-frequency co-time full duplex (CCFD) multiplexing. However, the resource configuration and scheduling of the MT functional module of the IAB node is configured by a parent IAB node through Radio Resource Control (RRC) signaling and downlink control information (DCI). The resource configuration of the DU functional module of the IAB node is configured by the donor CU. However, when the parent IAB node schedules the resource transmission of the MT functional module of the IAB node, the parent IAB node does not know the data to be sent by the DU functional module of the IAB node, the uplink (UL) data of an IAB next-hop node (that is, the MT functional module of the IAB node or the UE). Therefore, the parent IAB node does not know whether the multiplexing scheduling between the MT functional module and the DU functional module can be realized, which may cause insufficient use of IAB node resources and lower spectrum utilization efficiency.

Therefore, how to configure or schedule resources of the MT functional module and the DU functional module to implement different multiplexing modes at the IAB node and avoid the mismatch between the MT functional module and the DU functional module has become an urgent technical problem to be solved.

SUMMARY

The purpose of the embodiments of the present application is to provide a resource multiplexing indication method and apparatus and a device.

In a first aspect, a resource multiplexing indication method is provided, which is applied to a relay node, and the method includes: determining a multiplexing mode of the relay node based on target information, where the target information includes at least one of the following: multiplexing mode indication information; timing mode information; and resource type information.

In a second aspect, a resource multiplexing indication apparatus is provided, and the apparatus includes: a determining module, configured to determine a multiplexing mode of the relay node based on target information, where the target information includes at least one of the following: multiplexing mode indication information; timing mode information; and resource type information.

In a third aspect, a relay node is provided, including: a memory, a processor, and programs or instructions stored in the memory and executable on the processor, where the programs or the instructions, when executed by the processor, implement the steps of the method according to the first aspect.

In a fourth aspect, a readable storage medium is provided. The readable storage medium stores programs or instructions, and the programs or the instructions, when executed by the processor, implement the steps of the method according to the first aspect.

In a fifth aspect, a computer program product is provided, including a processor, a memory, and programs or instructions stored in the memory and executable on the processor, where the programs or the instructions, when executed by the processor, implement the steps of the method according to the first aspect.

According to a sixth aspect, a chip is provided, including a processor and a communication interface. The communication interface is coupled to the processor, and the processor is configured to run programs or instructions of a relay node to implement steps of the method provided in the first aspect.

In the embodiments of the present application, a resource multiplexing indication method is provided, and the multiplexing mode of the relay node can be accurately determined according to the obtained target information, so as to configure or schedule resources of the relay node based on the multiplexing mode. The target information may at least include at least one of multiplexing mode indication information, timing mode information, and resource type information. Specifically, the multiplexing mode of the relay node may be explicitly or implicitly indicated based on the multiplexing mode indication information, and the multiplexing mode of the relay node can be implicitly indicated based on the timing mode information or the resource type information. In this way, through this embodiment, the resource multiplexing corresponding to the multiplexing mode determined based on the target information can be realized at the relay node, avoiding insufficient resource use and low spectrum utilization efficiency, thereby reducing interference in the system and improving resource utilization in the system.

BRIEF DESCRIPTION OF DRAWINGS

The accompanying drawings illustrated herein are provided to further understand this application and form a part of this application. The exemplary embodiments of this application and the descriptions thereof are used to explain this application and do not constitute an improper limitation on this application. In the accompanying drawings:

FIG. 1 is a block diagram of a wireless communication system to which an embodiment of the present application is applicable;

FIG. 2 is a schematic diagram of a multiplexing scheduling relationship across hops in an IAB network in an embodiment of the present application;

FIG. 3 is a schematic flowchart of a resource multiplexing indication method in an embodiment of the present application;

DESCRIPTION OF EMBODIMENTS

Figure 4:
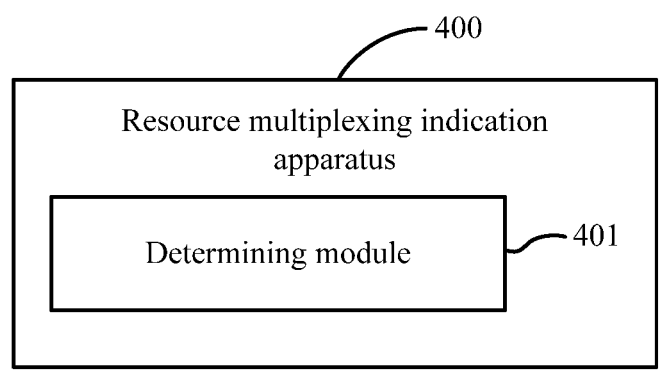
FIG. 4 is a schematic structural diagram of a resource multiplexing indication apparatus in an embodiment of the present application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "I" generally represents an "or" relationship between associated objects.

It should be noted that the technology described in the embodiments of the present application is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" in the embodiments of this application may be used interchangeably. The described technologies can be applied to both the systems and the radio technologies mentioned above as well as to other systems and radio technologies. However, a new radio (NR) system is described in the following description for illustrative purposes, and the NR terminology is used in most of the following description, although these technologies can also be applied to applications other than the NR system application, such as the 6th generation (6G) communication system.

FIG. 1 is a block diagram of a wireless communications system to which embodiments of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, or a laptop computer, or called a notebook computer, a personal digital assistant (PDA), a palmtop computer, a netbook, an ultra mobile personal computer (UMPC), a mobile internet device (MID), a wearable device, a vehicle user equipment (VUE), or a pedestrian user equipment (PUE). The wearable device includes bracelets, headphones, glasses, etc. It should be noted that a specific type of the terminal 11 is not limited in the embodiments of this application. The network side device 12 may be a base station or a core network device, and the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another appropriate term in the art. Provided that the same technical effect is achieved, the base station is not limited to specific technical vocabulary. It should be noted that the base station in an NR system is merely used as an example, but a specific type of the base station is not limited in the embodiments of this application.

In the embodiments of this application, when SDM, FDM or CCFD is used across hops in the IAB network, UE or a child IAB node (C-IABN, which can be called a first node), a current IAB node (called a second node or a first IAB node), and a parent IAB node (P-IABN, called a third node or a second IAB node) of this IAB node are involved. Data transmission of each hop is scheduled by different IAB nodes, that is, the data transmission of hop Hop1 (that is, a first hop) between the first node and the second node is scheduled by the second node, that is, the first IAB node, the data transmission of hop Hop2 (that is, a second hop) between the second node and the third node is scheduled by the third node, that is, the second IAB node, as shown in FIG. 2.

SDM means that an IAB node simultaneously receives a physical downlink shared channel (PDSCH) from its parent IAB node and receives a physical uplink shared channel (PUSCH) from its child IAB node or UE on a same time-frequency resource; or an IAB node simultaneously transmits a PUSCH to its parent IAB node and transmits a PDSCH to its child IAB node or UE on a same time-frequency resource.

Frequency division multiplexing FDM means that an IAB node simultaneously receives a PDSCH from its parent IAB node on different frequency resources, and receives a PUSCH from its child IAB node or UE; or an IAB node simultaneously transmits a PUSCH to its parent IAB node on different frequency resources, and transmits a PDSCH to its child IAB node or UE.

Co-frequency co-time full duplex means that an IAB node simultaneously receives a PDSCH from its parent IAB node and transmits a PDSCH to its child IAB node or UE on a same time-frequency resource; or an IAB node simultaneously transmits a PUSCH to its parent IAB node and receives a PUSCH from its child IAB node or UE on a same time-frequency resource. Multiple Panel Transmission Reception (MPTR) is a technology in which IAB nodes use different antenna modules (panels) to simultaneously transmit and receive respectively. For example, an IAB node is equipped with two antenna modules, and when one module receives, the other module transmits. The transceiver antenna modules of the MPTR can have a large degree of isolation, which can reduce the interference caused by transmission to reception to a certain extent.

The duplexing mode between the DU functional module and the MT functional module of the IAB node is divided into a half duplex mode and a full duplex mode. In the case of full duplex, the DU functional module/MT functional module can transmit and receive at the same time. Therefore, in the multiplexing mode of FDM or SDM, the transceiver operation modes of the DU functional module and the MT functional module are as follows.

(1) DU-TX&MT-TX. That is, the DU functional module is configured as a downlink (DL), and the MT functional module is configured as an uplink (UL); or the DU functional module has actual DL transmission, and the MT functional module has actual UL transmission.

(2) DU-RX&MT-RX. That is, the DU functional module is configured as UL, and the MT functional module is configured as DL; or the DU functional module has actual UL reception, and the MT functional module has actual DL reception.

(3) DU-TX&MT-RX. That is, the DU functional module is configured as DL, and the MT functional module is configured as DL; or the DU functional module has actual DL transmission, and the MT functional module has actual DL reception.

(4) DU-RX&MT-TX. That is, the DU functional module is configured as UL, and the MT functional module is configured as UL; or the DU functional module has actual UL reception, and the MT functional module has actual UL transmission.

To sum up, there are the following multiplexing modes between the MT functional module and the DU functional module of the IAB node.

(1) SDM TX: MT TX, DU TX.
(2) SDM RX: MT RX, DU RX.
(3) FDM TX: MT TX, DU TX.
(4) FDM RX: MT RX, DU RX.
(5) MPTR UL: MT TX, DU RX.
(6) MPTR DL: MT RX, DU TX.
(7) MT TX, MT RX, DU TX, and DU RX are supported at the same time.

DU TX and DU DL can be common, MT TX and MT UL can be common, DU RX and DU UL can be common, and MT RX and MT DL can be common.

In addition, for the resource configuration of the DU functional module of the IAB node, the donor node configures the resources of the DU functional module through F1-C signaling and gNB-DU resource configuration. The configuration of DL/UL/flexible symbol is included, and the type of symbol transmission in each slot is configured. Configurations of hard, soft, unavailable (NA), shared, and the like are included, and the availability of each type of symbol DU is configured.

Specifically, if the DL/UL/flexible symbol is configured as hard, the DU function module of the IAB node can transmit/receive/transmit or receive on the symbol. If the DL/UL/flexible symbol is configured as soft, if the transmitting/receiving/transmitting or receiving of the DU functional module of the TAB node does not affect the transmitting or receiving of the MT functional module, the DU functional module of the IAB node can transmit/receive/transmit or receive on this symbol; otherwise, does not transmit/receive/transmit or receive on the symbol. Further, the parent TAB node can indicate the availability of the soft symbol of the DU functional module of the IAB node through DCI format 2-5. If the DL/UL/flexible symbol is configured as NA, the DU function module of the IAB node will neither transmit nor receive on this symbol.

The resource configuration of the MT functional module of the IAB node is configured by the parent IAB node through RRC signaling, DCI signaling, etc., and the resource type of the MT is DL/UL/Flexible.

The flexible configuration may be processed similar to the DL/UL configuration, and may be processed independent of the DL/UL configuration.

The resource multiplexing indication method provided by the embodiments of the present application will be described in detail below through specific embodiments and application scenarios with reference to the accompanying drawings.

Referring to FIG. 3, an embodiment of the present application provides a resource multiplexing indication method, which is executed by a relay node, and the method includes the following process steps.

Step 301: Determine a multiplexing mode of the relay node based on target information, where the target information includes at least one of the following: multiplexing mode indication information; timing mode information; and resource type information.

In the embodiments of the present application, a resource multiplexing indication method is provided, and the multiplexing mode of the relay node can be accurately determined according to the obtained target information, so as to configure or schedule resources of the relay node based on the multiplexing mode. The target information may at least include at least one of multiplexing mode indication information, timing mode information, and resource type information. Specifically, the multiplexing mode of the relay node may be explicitly or implicitly indicated based on the multiplexing mode indication information, and the multiplexing mode of the relay node can be implicitly indicated based on the timing mode information or the resource type information. In this way, through this embodiment, the resource multiplexing corresponding to the multiplexing mode determined based on the target information can be realized at the relay node, avoiding insufficient resource use and low spectrum utilization efficiency, thereby reducing interference in the system and improving resource utilization in the system.

Optionally, in the resource multiplexing indication method in the embodiments of the present application, the relay node includes an integrated access and backhaul IAB node. It should be noted that the relay node in the embodiments of the present application includes but not limited to the IAB node, that is, in addition to the IAB node, the relay node may also include other node devices applicable to the resource multiplexing indication method in the embodiments of the present application.

Specifically, when the relay node is an IAB node, the step 301 can be specifically executed as follows: determining a multiplexing mode of the IAB node based on target information, where the target information includes at least one of the following: multiplexing mode indication information; timing mode information; and resource type information.

In the embodiments of the present application, a multiplexing mode indication method can be provided for the integrated access and backhaul IAB node, that is, the multiplexing mode of the IAB node can be accurately determined according to the obtained target information, so that the resource of the IAB node is configured or scheduled based on the multiplexing mode, especially, the resources of the MT function module and the DU function module of the IAB node are configured or scheduled, so as to realize different multiplexing modes at the IAB node, and avoid mismatch between the MT function module and the DU function module. The target information may at least include at least one of multiplexing mode indication information, timing mode information, and resource type information. Specifically, the multiplexing mode of the IAB node may be explicitly or implicitly indicated based on the multiplexing mode indication information, and the multiplexing mode of the IAB node can be implicitly indicated based on the timing mode information or the resource type information. In this way, through this embodiment, the resource multiplexing corresponding to the multiplexing mode determined based on the target information can be realized at the IAB node, avoiding insufficient resource use and low spectrum utilization efficiency, thereby reducing interference in the system and improving resource utilization in the system.

Optionally, in the resource multiplexing indication method in the embodiments of the present application, the target information may be determined through negotiation between the child IAB node and the parent IAB node, so as to determine the multiplexing mode.

Further optionally, the manner in which the child IAB node negotiates with the parent IAB node to determine the target information includes one of the following:

(1) the parent IAB node obtains resource configuration information of the DU functional module of the child IAB node, and the parent IAB node determines the target information the resource configuration information based on the first configuration information and the obtained resource configuration information of the DU functional module of the child IAB node; and (2) the child IAB node reports second configuration information to the parent IAB node, and the parent IAB node determines the target information based on the second configuration information and the first configuration information;

where the first configuration information is configured by the parent IAB node, and the first configuration information is applied to the MT function module of the IAB node. Further, the first configuration information includes but is not limited to at least one of the following: time division duplex (TDD) configuration; frequency domain resource configuration; time domain resource configuration; resource type configuration; a downlink buffer status (DL buffer status); an uplink buffer status (UL buffer status);

power; and link budget.

The second configuration information includes but is not limited to at least one of the following: an expected multiplexing mode of the child IAB node;

TDD configuration of the DU function module of the child IAB node;
frequency domain resource configuration of the DU functional module of the child IAB node;
a DL buffer status of the DU function module of the child IAB node;
a DL buffer status of the MT function module of the child IAB node;
an UL buffer status of the DU function module of the child IAB node;
an UL buffer status of the MT function module of the child IAB node;
transmit power of the DU functional module of the child IAB node;
transmit power of the MT functional module of the child IAB node;
link budget of the DU function module of the child IAB node; and
link budget of the MT function module of the child IAB node.

Further optionally, the target information is determined through negotiation between the child IAB node and the parent IAB node through first signaling; where the first signaling includes one of the following: specific radio resource control RRC signaling, specific backhaul access protocol (BAP) control protocol data unit (PDU) signaling; medium access control (MAC) control element (CE) signaling; and physical layer signaling.

Further optionally, the target information is determined through negotiation between the child IAB node and the parent IAB node by using a predefined resource, a preconfigured resource, a resource configured by the donor IAB node, a resource configured by the parent IAB node, a resource configured by the child IAB node, or a resource configured by the network side device.

Optionally, in the resource multiplexing indication method of the embodiments of the present application, the target information may be at least be associated with at least one of the following: (1) a capacity of the IAB node; optionally including a transmitting capacity and/or a receiving capacity of the MT functional module of the IAB node, and a transmitting capacity and/or a receiving capacity of the DU functional module of the IAB node. (2) a radio link condition; and (3) a service mode.

Optionally, in the resource multiplexing indication method of the embodiments of the present application, in a case that the target information for determining the multiplexing mode of the relay node includes multiplexing mode indication information, the multiplexing mode indication information may include but is not limited to at least one of the following.

(1) a transmitting and receiving status of a distributed unit DU functional module of an IAB node.

(2) a transmitting and receiving status of a mobile terminal MT functional module of the IAB node.

The transmitting and receiving status of the DU functional module and/or the MT functional module may include but is not limited to: transmit and receive at the same time; transmit at the same time; receive at the same time; one transmits and the other receives; one transmits, one receives; and neither transmits or receives.

Further optionally, each of the transmitting and receiving status of at least one of the DU functional module and the MT functional module of the IAB node is configured with a corresponding number. That is, each transmitting and receiving status of the DU functional module and/or MT functional module can be indicated, for example, in the form of "number/status". For example, 0 means transmitting and receiving at the same time; 1 means transmitting at the same time; 2 means receiving at the same time; and 3 means one transmitting and the other receiving.

Further optionally, multiple statuses of transmitting and receiving statuses of at least one of the DU functional module and the MT functional module of the IAB node are configured with a same number. That is, in addition to configuring an indication mode of a corresponding number for each transmitting and receiving status of the DU functional module and/or MT functional module, multiple statuses of the transmitting and receiving statuses of the DU functional module and/or MT functional module may be indicated based on the same content. For example, multiple transmitting and receiving statuses are indicated in the form of one "number/status".

(3) The duplex mode of the IAB node; where the duplex mode includes but is not limited to some or all of the following: MT TX; MT RX; DU TX; DU RX; MT TX, DU RX; MT RX, DU RX; MT TX, DU TX; MT TX, DU TX; MT TX, MT RX; DU TX, DU RX; MT TX, MT RX, DU TX, and DU RX. Herein, a TX/RX status of the DU functional module and the MT functional module of the IAB node can be indicated to indicate the duplex mode of the DU functional module and the MT functional module of the IAB node in a certain resource.

Further optionally, each of the duplex modes of the IAB node is configured with a corresponding number. That is, the duplex mode of the IAB node can be numbered to indicate the index. For example: 0 means MT TX; 1 means MT RX; 2 means DU TX; 3 means DU RX; 4 means MT TX, DU RX; 5 means MT RX, DU RX; 6 means MT TX, DU RX; 7 means MT RX, DU TX; and 8 means MT TX, MT RX, DU TX, DU RX.

Further optionally, multiple duplex modes of the IAB node are configured with the same number. That is, in addition to configuring the indication manner of a corresponding number for each of the duplex modes of the IAB node, multiple modes of the duplex modes of the IAB node may be indicated based on the same number.

(4) a resource multiplexing mode of the IAB node; where the resource multiplexing mode includes but is not limited to at least one of FDM, SDM and MPTR.

Optionally, the multiplexing mode indication information includes the duplex mode in the above (2) and the resource multiplexing mode in the above (3). In this case, the content indicated by the multiplexing mode indication information includes but is not limited to at least one of the following: FDM TX, FDM RX, SDM TX, SDM RX, MPTR UL, and MPTR DL.

(5) a link status corresponding to the DU functional module of the IAB node;

(6) a link status corresponding to the MT functional module of the IAB node; and Optionally, the foregoing link statuses include but are not limited to UL and DL.

(7) whether the DU functional module and the MT functional module of the IAB node support simultaneous use of a first resource, where the first resource includes at least one of a first time domain resource and a first frequency domain resource. That is, in one example, the DU functional module and the MT functional module can use a certain time domain resource and/or frequency domain resource at the same time; while in another example, the DU functional module and the MT functional module cannot use a certain time domain resource and/or frequency domain resource at the same time.

Further optionally, when the DU functional module and the MT functional module of the IAB node support simultaneous use of the first resource, the DU functional module and the MT functional module of the IAB node simultaneously use the first resource in a first duplex mode; where the first duplex mode is stipulated in a protocol (predefined), configured by a donor IAB node, configured by a parent IAB node, or configured by a network side device. The donor IAB node and the parent IAB node may also be referred to as network side devices.

Optionally, in the resource multiplexing indication method of the embodiments of the present application, the multiplexing mode indication information carries first information, and the first information may be at least used to indicate one of the following:

(1) the multiplexing mode is indicated per resource unit, and the resource unit includes at least one of a time domain resource unit and a frequency domain resource unit;

The resource unit may be stipulated in a protocol or configured by a network side device, and may also be configured through indication signaling. Further, the time domain resource unit can be: per slot; per symbol; per resource type, such as: UL/DL/Flexible, and/or Hard/Soft/NA; and per resource type of slot. The frequency domain resource unit can be: per physical resource block (per PRB); per resource unit (per RE); and per transmission type, such as: UL/DL/Flexible, and/or Hard/Soft/NA/shared.

Further, when configuring through the indication signaling, in an example, the indication signaling may indicate the multiplexing mode indication information after a time period (or period), after a time point, or within a frequency domain range, and the IAB node determines the multiplexing mode of the resources according to the resource unit, that is, the indication signaling takes effect after a certain time period (or period), after a certain time point, or within a certain frequency domain range. Specifically, according to the TDD conf configured for the IAB MT function module, and/or the TDD conf of the IAB DU function module, and/or the NA/Hard/soft conf of the IAB DU function module, and/or NA/Hard/soft conf of the DU function module of the parent IAB node, the IAB node finds a resource capable of implementing the indicated multiplexing mode within the time period or frequency domain, and determines that the resource adopts the indicated multiplexing mode, for example: (i) MT UL and DU DL, which can be regarded as a duplex mode that can realize MT TX and DU TX; (ii) MT UL and DU UL, which can be regarded as a duplex mode that can realize MT TX and DU RX; (iii) MT DL and DU DL, which can be regarded as a duplex mode that can realize MT RX and DU TX; and (iv) MT DL and DU UL, which can be regarded as a duplex mode that can realize MT RX and DU RX. In another example, the multiplexing mode used by the resource may be indicated separately for resources within a time period (or period), after a time point, or within a frequency domain range through indication signaling according to the above resource units, for example, a multiplexing mode of each resource type in each slot in a time period is indicated.

In an example, indication signaling appears at n, indicating the multiplexing mode on a time domain unit m, and corresponding multiplexing modes on the time domain unit m+T*K (K=0,1,2 . . . ) are all multiplexing modes indicated in n.

(2) The multiplexing mode is indicated periodically; that is, the multiplexing mode indicated by the first information takes effect periodically. That is, in the above example, a multiplexing mode indicated by activation signaling is valid for multiple time ranges.

(3) The multiplexing mode is indicated per one-shot; that is, the multiplexing mode indicated by the first information takes effect once and is only valid for one time range.

(4) the multiplexing mode is indicated in time domain;

(5) the multiplexing mode is indicated in frequency domain; and (6) the multiplexing mode is indicated in time domain and frequency domain.

Optionally, in the resource multiplexing indication method in the embodiments of the present application, the multiplexing mode indication information described in the above multiplexing mode indication information may be obtained in one of the following manners.

(1) Periodic obtaining; that is, the multiplexing mode indicates that the information itself occurs periodically. It can be further understood that the sender of the multiplexing mode indication information periodically transmits the multiplexing mode indication information.

(2) one-shot obtaining; that is, the multiplexing mode indicates that the information itself is one-shot or event-triggered. It can be further understood that the sender of the multiplexing mode indication information transmits the multiplexing mode indication information in one shot.

Optionally, in the resource multiplexing indication method in the embodiments of the present application, in a case that the target information for determining the multiplexing mode of the relay node includes timing mode information, the timing mode information is used to indicate a first timing mode, and the first timing mode is used to determine the multiplexing mode. That is, the multiplexing mode may be indicated implicitly based on the first timing mode.

The timing mode may refer to the timing mode of case 1 to case 7, that is, a timing alignment type of MT TX/RX and DU TX/RX. When case 6 timing mode is supported, MT TX and DU TX can be simultaneous, supporting FDM/SDM; when case 7 timing mode is supported, MT RX and DU RX can be simultaneous, supporting FDM/SDM; when case 6 and case 7 timing modes are supported, MT TX, DU TX, MT RX, and DU RX support any one or more of simultaneous transmission, simultaneous reception, one transmission and one reception, and simultaneous transmission and simultaneous reception, and any two or more of MT/DU TX/RX can be FDM/SDM. This includes MPTR UL/DL multiplexing.

Optionally, in the resource multiplexing indication method in the embodiments of the present application, in a case that the target information for determining the multiplexing mode of the relay node includes resource type information, the resource type information includes at least one of time domain resource type information and frequency domain resource type information, and at least one of the time domain resource type information and the frequency domain resource type information is used to determine the multiplexing mode.

Further optionally, the resource type information is used to determine a multiplexing mode corresponding to a resource within a target range or each sub-resource in a resource within the target range; where the target range includes a preset time period, a preset period, a preset frequency domain range, or a time domain range starting from a preset time point; and the sub-resource is obtained by dividing the resource within the target range according to resource units.

Further optionally, the time domain resource type information is used to indicate one of the following.

Shared resource type, dedicated resource type, Hard resource type, Soft resource type, and NA resource type.

The shared type indicates that the DU functional module and the MT functional module use the time domain resource at the same time.

Further optionally, the frequency domain resource type information is used to indicate one of the following: shared resource type, dedicated resource type, Hard resource type, Soft resource type, and NA resource type.

The shared type indicates that the DU functional module and the MT functional module use the frequency domain resource at the same time.

Optionally, the shared type indicates that the DU functional module and the MT functional module use time domain resources and frequency domain resources at the same time.

Further optionally, when the resource type information includes time domain resource type information and frequency domain resource type information, that is, time domain resource type configuration and frequency domain resource type configuration are supported at the same time, the availability of the resource is obtained as follows.

Method 1: If the time domain configuration is hard and the frequency domain configuration is hard, the resource is a hard resource; if the time domain configuration is soft and/or the frequency domain configuration is soft, the resource is a soft resource; if the time domain configuration is NA, and/or the frequency domain configuration is NA, the resource is NA.

Method 2: The configuration information of the time domain resource is used as a reference. For example, if the time domain configuration is hard, the resource is hard.

Method 3: Configuration information of frequency domain resources is used as a reference. For example, if the frequency domain configuration is hard, the resource is hard.

Optionally, in resource multiplexing indication method in the embodiments of this application, the target information that includes at least one of the multiplexing mode indication information, timing mode information, and resource type information may be indicated in at least one of the following manners:

(1) a dynamic indication, where the dynamic indication includes at least one of a physical layer signaling indication and a high layer signaling indication; and the physical layer signaling may include DCI signaling, a PDCCH, feedback information, etc., and the high layer signaling may include MACCE signaling, etc.

Further optionally, when the dynamic indication is a physical layer signaling indication, and the physical layer signaling is first downlink control information (DCI) signaling, the first DCI signaling includes one of the following:

(a) DCI signaling in a first DCI format; where the first DCI format may be a newly defined DCI format different from an existing DCI format.

(b) DCI signaling scrambled by a specific radio network temporary identifier (RNTI);

(c) DCI signaling in a specific search space (SS).

(d) DCI signaling in a specific Control resource set (CORESET); and (e) DCI signaling in a second DCI format, where the second DCI format is different from the first DCI format. The second DCI format can be an existing DCI format and a DCI format that redefines the meaning of DCI information, such as redefining one or some special code points to represent special meanings, and for another example, in DCI format 2-5, hard means activation, and soft and/or NA means inactivation.

(2) Semi-static indication, where the semi-static indication includes at least one of a radio resource control RRC signaling indication, a BAP control protocol data unit PDU signaling indication, and a F1-C signaling (that is, F1 interface control plane signaling, which is base station signaling) indication.

Optionally, in the resource multiplexing indication method of the embodiments of the present application, the target information is determined through a combination of a dynamic indication and a semi-static indication, and in a case that the target information is multiplexing mode configuration, timing mode configuration, multiplexing mode or timing mode, the multiplexing mode configuration, the timing mode configuration, the multiplexing mode or the timing mode is indicated based on the semi-static indication, and the multiplexing mode configuration, the timing mode configuration, the multiplexing mode or the timing mode is activated or deactivated based on the dynamic indication.

Optionally, in the resource multiplexing indication method of the embodiments of the present application, in a case that the target information is determined through a combination of a dynamic indication and a semi-static indication, and the target information is resource type information, the first resource type information corresponding to the first time domain range is indicated based on the semi-static indication, and second resource type information corresponding to some or all resources within the first time domain range is indicated based on the dynamic indication; where the first resource type information corresponds to a first multiplexing mode, and the second resource type information corresponds to a second multiplexing mode.

It can be understood that if the second resource type information indicated by the dynamic indication is different from the first resource type information indicated by the semi-static indication, that is, if there are changes, it means that the multiplexing mode may change accordingly, that is, the second multiplexing mode corresponding to the corresponding new resource type information.

Optionally, in resource multiplexing indication method in the embodiments of the present application, in a case that the target information is determined through a combination of dynamic indication and semi-static indication, the method may further include the following content: transmitting feedback information, where the feedback information is used to indicate that the activation signaling or the deactivation signaling is received successfully or received unsuccessfully.

Optionally, when the reception is successful, an acknowledgment (ACK) is fed back, and when the reception fails, a negative acknowledgment (NACK) is fed back, and vice versa. In one example, if the parent IAB node or donor IAB node receives an ACK, it is considered that activation/deactivation succeeds; if NACK is received, it is considered that activation/deactivation fails; if discontinuous Transmission (DTX) is received (or no signaling is received), it is considered that the activation/deactivation fails.

Further optionally, the activation signaling or the deactivation signaling carries feedback indication information.

Further optionally, the feedback indication information is used to indicate a feedback resource, and the feedback resource is used to transmit the feedback information; where the feedback indication information includes at least one of time domain resource indication information and frequency domain resource indication information.

Optionally, the feedback indication information may be carried in activation signaling sent by the parent IAB node, such as DCI signaling and MAC CE signaling. The time domain resource indication information may be time domain interval indication information, or used to indicate the interval between the feedback resource and the received DCI signaling or MAC CE signaling.

Further optionally, a relationship between a resource for receiving the activation signaling or the deactivation signaling and a feedback resource is determined based on protocol agreement or pre-configuration. That is, the position of the feedback resource can be obtained based on the predefined/preconfigured relationship between the feedback resource and received activation/deactivation signaling. In an example, the MT function module of the IAB node may obtain feedback resource information according to a resource of the received activation/deactivation signaling and defined rules, and then transmit feedback information on the feedback resource. If the parent IAB node does not receive the feedback information, it is considered that the transmission of the activation/deactivation signaling fails.

In a specific embodiment of the resource multiplexing indication method of the present application, the IAB donor configures the UL/DL/flexible symbol multiplexing mode in each slot for the IAB node through F1-C signaling. The optional value is a duplex mode in which multiplexing mode indication information pre-defined in the protocol is IAB. The optional configuration includes: MT TX; MT RX; DU TX; DU RX; MT TX, DU RX; MT RX, DU RX; MT TX, DU TX; MT TX, DU TX; MT TX, MT RX; DU TX, DU RX; MT TX, MT RX, DU TX, DU RX. The parent IAB node obtains the configuration information of the DU function module of the IAB node, and transmits DCI format2-6 to activate/deactivate the multiplexing mode on the time domain resource.

In another specific embodiment of the resource multiplexing indication method of the present application, the protocol predefines multiplexing rules. If the MT functional module of the IAB node and the DU functional module of the IAB node support the use of the same time-frequency domain, the MT functional module and the DU functional module of the IAB node support SDM multiplexing; if the MT functional module of the IAB node and the DU functional module of the IAB node are configured with the same time domain resources and different frequency domain resources, the MT functional module of the IAB node and the IAB The DU functional module of the node indicate FDM/SDM multiplexing. The IAB donor transmits F1-C to configure the DU function module as DL on slot k, and the available PRBs are 20-39; the parent IAB node configures MT as UL on slot k, and the scheduled PRBs are 0-19. According to a predefined rule, the IAB node can support FDM multiplexing on slot k. The time-frequency domain resource configuration information of the DU functional module can be obtained based on the parent IAB node, and the MT functional module of the IAB node is scheduled according to the resource information of the DU functional module. That is, the parent IAB node schedules the MT functional module according to the resources of the DU functional module.

In yet another specific embodiment of the resource multiplexing indication method of the present application, the protocol pre-defines the multiplexing mode of the IAB according to the timing mode of the IAB node. The IAB donor indicates the multiplexing mode of the IAB node in the time domain through F1-C signaling, and the optional configurations are: timing mode case 1; timing mode case 6;

timing mode case 7; and timing mode case 6 and timing mode case 7. The IAB node determines the multiplexing state according to the F1-C signaling. Specifically: if it is timing mode case 1, the MT functional module and the DU functional module perform TDM multiplexing. If it is timing mode case 6, the MT functional module and DU functional module can support FDM/SDM TX. If it is timing mode case 7, the MT functional module and DU functional module can support FDM/SDM RX. If it is timing mode case 6 and timing mode case 7, the MT functional module and DU functional module can support FDM/SDM TX/RX. Further, the parent IAB node transmits the multiplexing status of the DCI activation/deactivation IAB node.

In yet another specific embodiment of the resource multiplexing indication method of the present application, the multiplexing mode indication information predefined in the protocol is the duplex mode of the IAB node, and for a table corresponding to the predefined duplex mode, a table configuration is shown in Table 1, the indicated candidate values are: 0, 1, 2, 3, 4, 5, 6, and 7. The IAB donor configures the duplex mode and resource configuration information of the IAB DU through F1-C. Available values are [0:7]. The MT function module of the IAB node reports the expected multiplexing mode of the IAB node to the parent IAB node through MAC CE signaling, and the IAB parent node can indicate, through DCI signaling according to the TDD configuration/buffer status, multiplexing of time domain resources activated/deactivated by the IAB node. The DCI signaling is indicated by DCI format 2-5, and if the indication of DCI format 2-5 is Hard, it means that the multiplexing mode indicated on the resource is activated, otherwise, is deactivated.

TABLE 1

| Index value | 0 | 1 | 2 | 3 | 4 FDM/SDM TX | 5 FDM/SDM RX | 6 MPTR UL | 7 MPTR DL |
| Index | TDM | TDM | TDM | TDM | | | | |
|---|---|---|---|---|---|---|---|---|
| MT TX | ✓ | | | | ✓ | | ✓ | |
| MT RX | | ✓ | | | | ✓ | | ✓ |
| DU TX | | | ✓ | | ✓ | | | ✓ |
| DU RX | | | | ✓ | | ✓ | ✓ | |

In yet another specific embodiment of the resource multiplexing indication method in this application, the gNB-DU cell resource configuration in F1-C includes the following information.

Example 1

Multiplexingmode-TransmissionPeriodicity
MultiplexingmodeSlotConfigList
>MultiplexingmodeSlotConfigItem
>>Multiplexingmodedownlink ENUMERATED (FDM, SDM, MPTR, TDM)
>>Multiplexingmodeuplink ENUMERATED (FDM, SDM, MPTR, TDM)
>>Multiplexingmodeflexible ENUMERATED (FDM, SDM, MPTR, TDM)

Example 2

SharedDedicated-TransmissionPeriodicity
SharedDedicatedslotConfigList
>SharedDedicatedConfigItem >>SharedDedicateddownlink ENUMERATED (shared, not shared)
>>sharedDedicateduplink ENUMERATED (shared, not shared)
>>sharedDedicatedflexible ENUMERATED (shared, not shared)

Example 3

Multiplexingmode-TransmissionPeriodicity
MultiplexingmodeSlotConfigList
>MultiplexingmodeSlotConfigItem
>>Multiplexingmodedownlink ENUMERATED (0,1,2,3,4,5,6,7)
>>Multiplexingmodeuplink ENUMERATED (0,1,2,3,4,5,6,7)
>>Multiplexingmodeflexible ENUMERATED (0,1,2,3,4,5,6,7)

Example 4

Multiplexingmode-TransmissionPeriodicity
MultiplexingmodeSlotConfigList
>MultiplexingmodeSlotConfigItem
>>Multiplexingmodedownlink ENUMERATED (MT TX; MT RX; DU TX; DU RX; MT TX, DU RX; MT RX, DU RX; MT TX, DU TX; MT TX, DU TX; MT TX, MT RX; DU TX, DU RX; MT TX, MT RX, DU TX, DU RX)
>>Multiplexingmodeuplink ENUMERATED (MT TX; MT RX; DU TX; DU RX; MT TX, DU RX; MT RX, DU RX; MT TX, DU TX; MT TX, DU TX; MT TX, MT RX; DU TX, DU RX; MT TX, MT RX, DU TX, DU RX)
>>Multiplexingmodeflexible ENUMERATED (MT TX; MT RX; DU TX; DU RX; MT TX, DU RX; MT RX, DU RX; MT TX, DU TX; MT TX, DU TX; MT TX, MT RX; DU TX, DU RX; MT TX, MT RX, DU TX, DU RX)

To sum up, it can be seen that the resource multiplexing indication method of the embodiments of the present application can be based on the coordination between the MT functional module of the IAB node and the DU functional module of the IAB node, to realize simultaneous transmission of at least two of MT/DU TX/RX on certain resources, thereby improving resource utilization in the system.

It should be noted that, the resource multiplexing indication method performed by the relay node provided in the embodiments of the present application may be performed by the resource multiplexing indication apparatus, or a control module of the resource multiplexing indication apparatus configured to perform the resource multiplexing indication method. In an embodiment of the application, the resource multiplexing indication apparatus provided in the embodiments of the application is described by using an example in which the resource multiplexing indication method is performed by a resource multiplexing indication apparatus.

Referring to FIG. 4, the embodiment of the present application provides a resource multiplexing indication apparatus 400, and the resource multiplexing indication apparatus 400 includes: a determining module 401, configured to determine a multiplexing mode of the relay node based on target information, where the target information includes at least one of the following: multiplexing mode indication information; timing mode information; and resource type information.

Optionally, in the resource multiplexing indication apparatus 400 in the embodiments of the present application, the relay node includes an integrated access and backhaul IAB node.

Optionally, in the resource multiplexing indication apparatus 400 of the embodiments of the present application, the multiplexing mode indication information includes at least one of the following: a transmitting and receiving status of a distributed unit DU functional module of an IAB node; a transmitting and receiving status of a mobile terminal MT functional module of the IAB node; a duplex mode of the IAB node; a resource multiplexing mode of the IAB node; a link status corresponding to the DU functional module of the IAB node; a link status corresponding to the MT functional module of the IAB node; and whether the DU functional module and the MT functional module of the IAB node support simultaneous use of a first resource, where the first resource includes at least one of a first time domain resource and a first frequency domain resource.

Optionally, in the resource multiplexing indication apparatus 400 of the embodiments of the present application, each of the transmitting and receiving status of at least one of the DU functional module and the MT functional module of the IAB node is configured with a corresponding number; or multiple statuses of transmitting and receiving statuses of at least one of the DU functional module and the MT functional module of the IAB node are configured with a same number.

Optionally, in the resource multiplexing indication apparatus 400 of the embodiments of the present application, each of duplex modes of the IAB node is configured with a corresponding number; or multiple of duplex modes of the IAB node are configured with a same number.

Optionally, in the resource multiplexing indication apparatus 400 of the embodiments of the present application, when the DU functional module and the MT functional module of the IAB node support simultaneous use of the first resource, the DU functional module and the MT functional module of the IAB node simultaneously use the first resource in a first duplex mode; where the first duplex mode is stipulated in a protocol, configured by a donor IAB node, configured by a parent IAB node, or configured by a network side device.

Optionally, in the resource multiplexing indication apparatus 400 of the embodiments of the present application, the multiplexing mode indication information carries first information, and the first information is used to indicate one of the following: the multiplexing mode is indicated per resource unit, and the resource unit includes at least one of a time domain resource unit and a frequency domain resource unit; the multiplexing mode is indicated per period; the multiplexing mode is indicated by one-shot; the multiplexing mode is indicated in time domain; the multiplexing mode is indicated in frequency domain; and the multiplexing mode is indicated in time domain and frequency domain.

Optionally, in the resource multiplexing indication apparatus 400 of the embodiments of the present application, the multiplexing mode indication information includes one of the following: periodic obtaining; and one-shot obtaining.

Optionally, in the resource multiplexing indication apparatus 400 of the embodiments of the present application, the timing mode information is used to indicate a first timing mode, and the first timing mode is used to determine the multiplexing mode.

Optionally, in the resource multiplexing indication apparatus 400 of the embodiments of the present application, the resource type information includes at least one of time domain resource type information and frequency domain resource type information, and at least one of the time domain resource type information and the frequency domain resource type information is used to determine the multiplexing mode.

Optionally, in the resource multiplexing indication apparatus 400 of the embodiments of the present application, the resource type information is used to determine a multiplexing mode corresponding to a resource within a target range or each sub-resource in a resource within the target range; where the target range includes a preset time period, a preset period, a preset frequency domain range, or a time domain range starting from a preset time point; and the sub-resource is obtained by dividing the resource within the target range according to resource units.

Optionally, in the resource multiplexing indication apparatus 400 of the embodiments of the present application, the time domain resource type information and the frequency domain resource type information are used to indicate one of the following: shared resource types, dedicated resource types, hard Hard resource types, soft Soft resource types, and unavailable NA resource types.

Optionally, in the resource multiplexing indication apparatus 400 of the embodiments of the present application, the target information is indicated in at least one of the following manners: a dynamic indication, where the dynamic indication includes at least one of a physical layer signaling indication and a high layer signaling indication; and a semi-static indication, where the semi-static indication includes at least one of a radio resource control RRC signaling indication, a backhaul access protocol BAP control protocol data unit PDU signaling indication, and an F1-C signaling indication.

Optionally, in the resource multiplexing indication apparatus 400 of the embodiments of the present application, when the dynamic indication is a physical layer signaling indication, and the physical layer signaling is first downlink control information DCI signaling, the first DCI signaling includes one of the following: DCI signaling in a first DCI format; DCI signaling scrambled by a specific radio network temporary identifier RNTI; DCI signaling in a specific search space SS; DCI signaling in a specific control resource set CORESET; and DCI signaling in a second DCI format, where the second DCI format is different from the first DCI format.

Optionally, in the resource multiplexing indication apparatus 400 of the embodiments of the present application, the target information is determined through a combination of a dynamic indication and a semi-static indication, and in a case that the target information is multiplexing mode configuration, timing mode configuration, multiplexing mode or timing mode, the multiplexing mode configuration, the timing mode configuration, the multiplexing mode or the timing mode is indicated based on the semi-static indication, and the multiplexing mode configuration, the timing mode configuration, the multiplexing mode or the timing mode is activated or deactivated based on the dynamic indication.

Optionally, in the resource multiplexing indication apparatus 400 of the embodiments of the present application, in a case that the target information is determined through a combination of a dynamic indication and a semi-static indication, and the target information is resource type information, the first resource type information corresponding to the first time domain range is indicated based on the semi-static indication, and second resource type information corresponding to some or all resources within the first time domain range is indicated based on the dynamic indication; where the first resource type information corresponds to a first multiplexing mode, and the second resource type information corresponds to a second multiplexing mode.

Optionally, the resource multiplexing indication apparatus 400 of the embodiments of the present application may further include: a transmitting module, configured to transmit feedback information, where the feedback information is used to indicate that activation signaling or deactivation signaling is received successfully or received unsuccessfully Optionally, in the resource multiplexing indication apparatus 400 of the embodiments of the present application, the activation signaling or deactivation signaling carries feedback indication information.

Optionally, in the resource multiplexing indication apparatus 400 of the embodiments of the present application, the feedback indication information is used to indicate a feedback resource, and the feedback resource is used to transmit the feedback information; where the feedback indication information includes at least one of time domain resource indication information and frequency domain resource indication information.

Optionally, in the resource multiplexing indication apparatus 400 of the embodiments of the present application, a relationship between a resource for receiving the activation signaling or the deactivation signaling and a feedback resource is determined based on protocol agreement or pre-configuration.

Optionally, in the resource multiplexing indication apparatus 400 of the embodiments of the present application, the manner in which the child IAB node negotiates with the parent IAB node to determine the target information includes one of the following: the parent IAB node obtains resource configuration information of the DU functional module of the child IAB node, and the parent IAB node determines the target information the resource configuration information based on the first configuration information and the obtained resource configuration information of the DU functional module of the child IAB node; and the child IAB node reports second configuration information to the parent IAB node, and the parent IAB node determines the target information based on the second configuration information and the first configuration information, where the first configuration information is configured by the parent IAB node.

Optionally, in the resource multiplexing indication apparatus 400 of the embodiments of the present application, the first configuration information includes at least one of the following: time division duplex (TDD) configuration; frequency domain resource configuration; time domain resource configuration; resource type configuration; a downlink buffer status; an uplink buffer status; power; and link budget.

Optionally, in the resource multiplexing indication apparatus 400 of the embodiments of the present application, the second configuration information includes at least one of the following: an expected multiplexing mode of the child IAB node; TDD configuration of the DU function module of the child IAB node; frequency domain resource configuration of the DU functional module of the child IAB node; a DL buffer status of the DU function module of the child IAB node; a DL buffer status of the MT function module of the child IAB node; an UL buffer status of the DU function module of the child IAB node; an UL buffer status of the MT function module of the child IAB node; transmit power of the DU functional module of the child IAB node; transmit power of the MT functional module of the child IAB node; link budget of the DU function module of the child IAB node; and link budget of the MT function module of the child IAB node.

Optionally, in the resource multiplexing indication apparatus 400 of the embodiments of the present application, the target information is determined through negotiation between the child IAB node and the parent IAB node through first signaling; where the first signaling includes one of the following: specific radio resource control RRC signaling, specific BAP control protocol data unit PDU signaling; medium access control MAC control element CE signaling; and physical layer signaling.

Optionally, in the resource multiplexing indication apparatus 400 of the embodiments of the present application, the target information is determined through negotiation between the child IAB node and the parent IAB node by using a predefined resource, a pre-configured resource, a resource configured by the donor IAB node, a resource configured by the parent IAB node, a resource configured by the child IAB node, or a resource configured by the network side device.

Optionally, in the resource multiplexing indication apparatus 400 of the embodiments of the present application, the target information is associated with at least one of the following: a capacity of the IAB node; a radio link condition; and a service mode.

In the embodiments of the present application, a resource multiplexing indication method is provided, and the multiplexing mode of the relay node can be accurately determined according to the obtained target information, so as to configure or schedule resources of the relay node based on the multiplexing mode. The target information may at least include at least one of multiplexing mode indication information, timing mode information, and resource type information. Specifically, the multiplexing mode of the relay node may be explicitly or implicitly indicated based on the multiplexing mode indication information, and the multiplexing mode of the relay node can be implicitly indicated based on the timing mode information or the resource type information. In this way, through this embodiment, the resource multiplexing corresponding to the multiplexing mode determined based on the target information can be realized at the relay node, avoiding insufficient resource use and low spectrum utilization efficiency, thereby reducing interference in the system and improving resource utilization in the system.

The resource multiplexing indication apparatus in the embodiments of this application can be an apparatus, or a component, an integrated circuit, or a chip in a network side device. The apparatus may be a network side device. Exemplarily, the network side device may include, but not limited to, the types of network side device 12 listed above, such as a relay node, where the relay node may include an IAB node.

The resource multiplexing indication apparatus in this embodiment of the present application may be an apparatus with an operating system. The operating system may be an Android operating system, an iOS operating system, or another possible operating system. This is not specifically limited in the embodiments of this application.

The resource multiplexing indication apparatus provided by the embodiments of the application can realize each process of the method embodiment of FIG. 3, and achieve the same technical effect. To avoid repetition, it will not be repeated herein.

Figure 5:
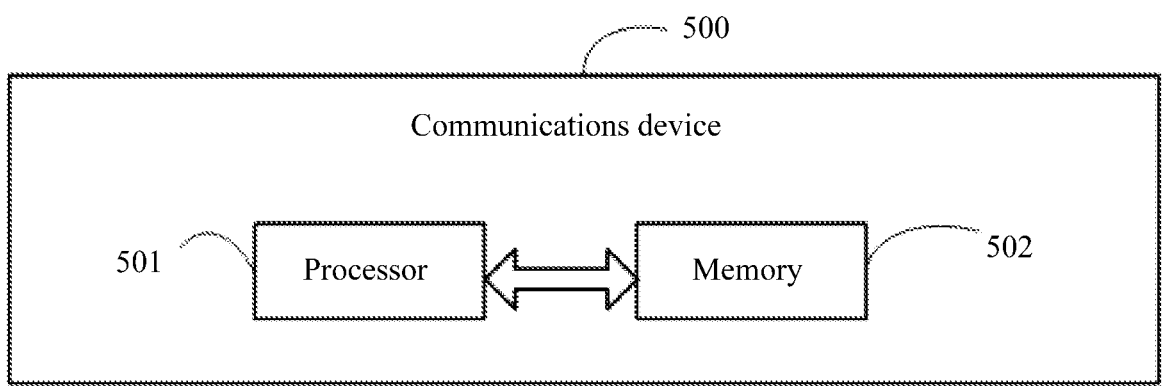
FIG. 5 is a schematic structural diagram of a communication device in an embodiment of the present application.

Optionally, as shown in FIG. 5, the embodiments of the present application also provide a communication device 500, which includes a processor 501, a memory 502, and programs or instructions stored in the memory 502 and executable on the processor 501. For example, when the communication device 500 is a relay node, the programs or instructions are executed by the processor 501 to realize the processes of the resource multiplexing indication method embodiment shown in FIG. 3 and achieve the same technical effect. To avoid repetition, it will not be repeated herein. The relay node includes an IAB node.

Figure 6:
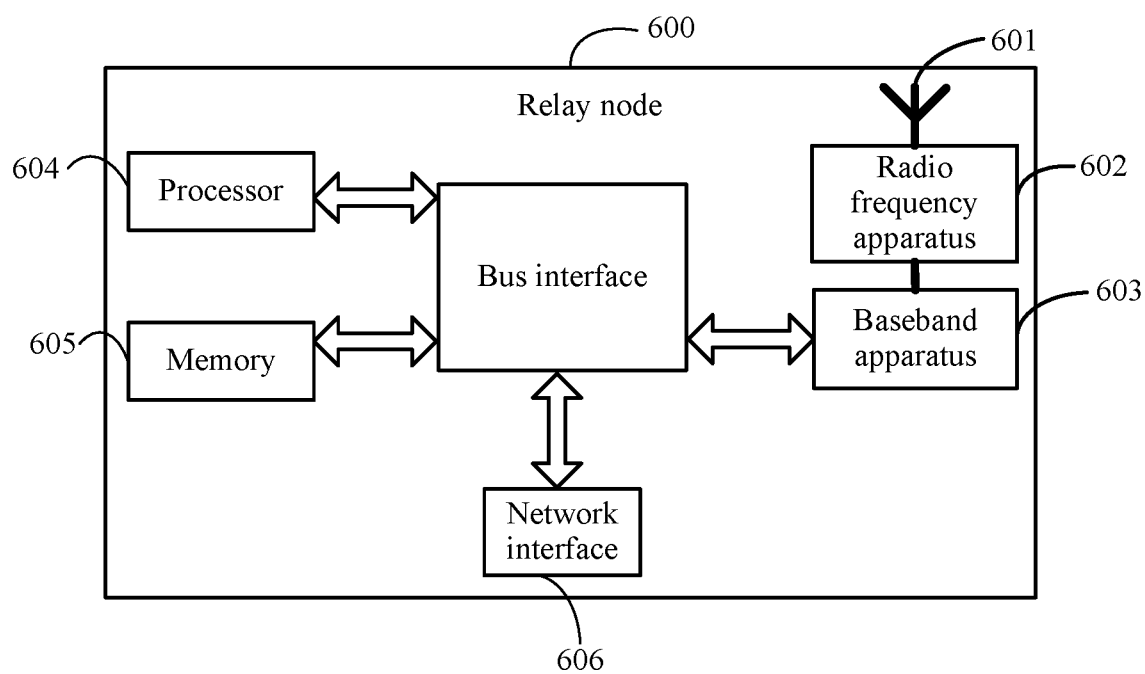
FIG. 6 is a schematic structural diagram of a relay node in an embodiment of the present application.

An embodiment of this application further provides a relay node. As shown in FIG. 6, the relay node 600 includes: an antenna 601, a radio frequency apparatus 602, and a baseband apparatus 603. The antenna 601 is connected to the radio frequency apparatus 602.

In an uplink direction, the radio frequency apparatus 602 receives information by using the antenna 601, and transmits the received information to the baseband apparatus 603 for processing. In a downlink direction, the baseband apparatus 603 processes information that needs to be sent, and transmits processed information to the radio frequency apparatus 602. The radio frequency apparatus 602 processes the received information, and transmits processed information by using the antenna 601. Optionally, the relay node may include an IAB node.

The resource multiplexing indication apparatus may be located in the baseband apparatus 603, and the method performed by the relay node in the foregoing embodiment may be implemented in the baseband apparatus 603. The baseband apparatus 603 includes a processor 604 and a memory 605.

The baseband apparatus 603 may include, for example, at least one baseband board, and a plurality of chips are arranged on the baseband board. As shown in FIG. 60, one of the chips is, for example, the processor 604, and is connected to the memory 605, to invoke a program in the memory 605, so as to perform the operations of the relay node shown in the foregoing method embodiment.

The baseband apparatus 603 may further include a network interface 606, configured to exchange information with the radio frequency apparatus 602, where the interface is, for example, a common public radio interface (CPRI for short).

Specifically, the relay node 600 in this embodiment of this application further includes programs or instructions stored in the memory 605 and capable of running on the processor 604, and the processor 604 invokes the programs or instructions in the memory 605 to perform the method performed by the modules show in FIG. 4, and achieve the same technical effect. In order to avoid repetition, it will not be repeated herein.

An embodiment of the present application further provides a readable storage medium. The readable storage medium stores programs or instructions. When the programs or instructions are executed by a processor, the processes of the foregoing embodiment of the resource multiplexing indication method are implemented, and a same technical effect can be achieved. To avoid repetition, details are not described herein again.

The processor is the processor in the communication device or the relay node described in the foregoing embodiments. The readable storage medium includes a computer-readable storage medium, such as computer Read-Only Memory (ROM), Random Access Memory (RAM), magnetic disk or optical disk, etc.

The embodiment of the present application further provides a computer program product, where the computer program product includes a processor, a memory, and a program or an instruction stored in the memory and executable on the processor, and when the program or instruction is executed by executed by the processor, each process of the above-mentioned corresponding embodiments of the resource multiplexing indication method can be realized, and the same technical effect can be achieved. To avoid repetition, details are not repeated herein.

An embodiment of this application further provides a chip, where the chip includes a processor and a communication interface, the communication interface is coupled to the processor, and the processor is configured to run a program or an instruction of a relay node to implement the foregoing processes of the foregoing embodiment of the resource multiplexing indication method, and a same technical effect can be achieved. To avoid repetition, details are not described herein again.

It should be understood that the chip mentioned in the embodiment of this application can also be called a system-level chip, a system chip, a chip system, or a system on chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of the present application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A resource multiplexing indication method, performed by a relay node, the method comprising:
   determining a multiplexing mode of the relay node based on target information, wherein the target information comprises: timing mode information;
   wherein the relay node comprises an integrated access and backhaul (IAB) node, and the target information is determined through negotiation between the IAB node and a parent IAB node; and
   the IAB node reports second configuration information to the parent IAB node, and the second configuration information comprises transmit power of a mobile terminal (MT) functional module of the IAB node.

2. The method according to claim 1, wherein the target information further comprises multiplexing mode indication information; and the multiplexing mode indication information comprises at least one of the following:
   a transmitting and receiving status of a distributed unit (DU) functional module of the IAB node;
   a transmitting and receiving status of the MT functional module of the IAB node;
   a duplex mode of the IAB node;
   a resource multiplexing mode of the IAB node;
   a link status corresponding to the DU functional module of the IAB node;
   a link status corresponding to the MT functional module of the IAB node; and
   whether the DU functional module and the MT functional module of the IAB node support simultaneous use of a first resource, wherein the first resource comprises at least one of a first time domain resource and a first frequency domain resource.

3. The method according to claim 2, wherein
   each of the transmitting and receiving status of at least one of the DU functional module and the MT functional module of the IAB node is configured with a corresponding number; or
   multiple statuses of transmitting and receiving statuses of at least one of the DU functional module and the MT functional module of the IAB node are configured with a same number.

4. The method according to claim 2, wherein
   each of duplex modes of the IAB node is configured with a corresponding number; or
   multiple of duplex modes of the IAB node are configured with a same number.

5. The method according to claim 2, wherein when the DU functional module and the MT functional module of the IAB node support simultaneous use of the first resource, the DU functional module and the MT functional module of the IAB node simultaneously use the first resource in a first duplex mode;

wherein the first duplex mode is stipulated in a protocol, configured by a donor IAB node, configured by the parent IAB node, or configured by a network side device.

6. The method according to claim 2, wherein the multiplexing mode indication information carries first information, and the first information is used to indicate one of the following:
   the multiplexing mode is indicated per resource unit, and the resource unit comprises at least one of a time domain resource unit and a frequency domain resource unit;
   the multiplexing mode is indicated per period;
   the multiplexing mode is indicated by one-shot;
   the multiplexing mode is indicated in time domain;
   the multiplexing mode is indicated in frequency domain; and
   the multiplexing mode is indicated in time domain and frequency domain.

7. The method according to claim 1, wherein the target information further comprises multiplexing mode indication information, and a manner of obtaining the multiplexing mode indication information comprises one of the following:
   periodic obtaining; and
   one-shot obtaining.

8. The method according to claim 1, wherein the timing mode information is used to indicate a first timing mode, and the first timing mode is used to determine the multiplexing mode.

9. The method according to claim 1, wherein the target information further comprises resource type information; and the resource type information comprises at least one of time domain resource type information and frequency domain resource type information, and at least one of the time domain resource type information and the frequency domain resource type information is used to determine the multiplexing mode.

10. The method according to claim 1, wherein the target information is indicated in at least one of the following manners:
    a dynamic indication, wherein the dynamic indication comprises at least one of a physical layer signaling indication and a high layer signaling indication; and
    a semi-static indication, wherein the semi-static indication comprises at least one of a radio resource control (RRC) signaling indication, a backhaul access protocol (BAP) control protocol data unit (PDU) signaling indication, and an F1-C signaling indication.

11. The method according to claim 1, wherein a manner in which the IAB node negotiates with the parent IAB node to determine the target information comprises:
    the parent IAB node determines the target information based on the second configuration information and first configuration information;
    wherein the first configuration information is configured by the parent IAB node.

12. The method according to claim 11, wherein the first configuration information comprises at least one of the following:
    time division duplex (TDD) configuration;
    frequency domain resource configuration;
    time domain resource configuration;
    resource type configuration;
    downlink (DL) buffer status;
    uplink (UL) buffer status;
    power; and
    link budget.

13. The method according to claim 1, wherein the second configuration information further comprises at least one of the following:
- an expected multiplexing mode of the IAB node;
- TDD configuration of a DU functional module of the IAB node;
- frequency domain resource configuration of the DU functional module of the IAB node;
- a DL buffer status of the DU functional module of the IAB node;
- a DL buffer status of the MT functional module of the IAB node;
- an UL buffer status of the DU functional module of the IAB node;
- an UL buffer status of the MT functional module of the IAB node;
- transmit power of the DU functional module of the IAB node;
- link budget of the DU functional module of the IAB node; and
- link budget of the MT functional module of the IAB node.

14. The method according to claim 1, wherein the target information is determined through negotiation between the IAB node and the parent IAB node through first signaling; wherein the first signaling comprises one of the following:
- specific radio resource control (RRC) signaling;
- specific BAP control protocol data unit (PDU) signaling;
- medium access control (MAC) control element (CE) signaling; and
- physical layer signaling.

15. The method according to claim 1, wherein the target information is determined through negotiation between the IAB node and the parent IAB node by using a predefined resource, a pre-configured resource, a resource configured by a donor IAB node, a resource configured by the parent IAB node, a resource configured by the IAB node, or a resource configured by a network side device.

16. The method according to claim 1, wherein the target information is associated with at least one of the following:
- a capacity of the IAB node;
- a radio link condition; and
- a service mode.

17. A relay node, comprising: a memory, a processor, and instructions stored in the memory and executable on the processor, wherein the instructions, when executed by the processor, cause the processor to:
- determine a multiplexing mode of the relay node based on target information, wherein the target information comprises; timing mode information;
- wherein the relay node comprises an integrated access and backhaul (IAB) node, and the target information is determined through negotiation between the IAB node and a parent IAB node; and
- the IAB node reports second configuration information to the parent IAB node, and the second configuration information comprises transmit power of a mobile terminal (MT) functional module of the IAB node.

18. A non-transitory readable storage medium, storing instructions, wherein the instructions, when executed by a processor of a relay node, cause the processor to: determine a multiplexing mode of the relay node based on target information, wherein the target information comprises: timing mode information;
- wherein the relay node comprises an integrated access and backhaul (IAB) node, and the target information is determined through negotiation between the IAB node and a parent IAB node; and
- the IAB node reports second configuration information to the parent IAB node, and the second configuration information comprises transmit power of a mobile terminal (MT) functional module of the IAB node.

* * * * *